["11] 3,832,902
[45] Sept. 3, 1974

United States Patent
Usami et al.

[54] TEMPERATURE MEASURING METHOD AND DEVICE

[75] Inventors: Susumu Usami, Nagoya; Yasuhiro Goto, Gifu; Takashi Yamashita, Nagoya, all of Japan

[73] Assignee: Kabushiki Kaisha Tokai Rika Denki Seisakusho, Nishikasugai-gun, Aichi Prefecture, Japan

[22] Filed: Sept. 9, 1971

[21] Appl. No.: 179,054

[30] Foreign Application Priority Data
Sept. 12, 1970 Japan.................................. 45-79855

[52] U.S. Cl............................ 73/362 AR, 73/362.8
[51] Int. Cl.......................... G01k 1/18, G01k 7/24
[58] Field of Search............ 73/362 AR, 359, 362.8; 323/75 H; 338/28

[56] References Cited
UNITED STATES PATENTS
3,025,706  3/1962  Oppenheim.................... 73/362 AR
3,142,170  7/1964  Calhoun......................... 73/362 AR
3,296,866  1/1967  Zenmon......................... 73/362 AR Primary Examiner—Richard C. Queisser
Assistant Examiner—Denis E. Corr
Attorney, Agent, or Firm—Woodhams, Blanchard and Flynn

[57] ABSTRACT

A method and a device for measuring an inside temperature or a real temperature of a substance which has a difference in temperature between the inside thereof and the surface thereof, comprising a preheating step or circuit for heating, prior to measuring, a heat sensitive element such as a thermistor to a temperature close to said inside temperature or said real temperature. With such a method or a device, the time required for measuring the inside temperature or the real temperature of the substance as mentioned above can be much shortened.

5 Claims, 6 Drawing Figures

INVENTORS
SUSUMU USAMI
YASUHIRO GOTO
TAKASHI YAMASHITA
BY Woodhams, Blanchard and Flynn
ATTORNEYS

TEMPERATURE MEASURING METHOD AND DEVICE

This invention relates to a method and device for measuring a temperature and more particularly to a method and a device for measuring an inner temperature of a substance or a real temperature of a substance which has a difference in temperature between the inside thereof and the surface thereof.

There has been conventionally provided a temperature measuring device employing a heat sensitive element such as a thermistor. However, such a conventional temperature measuring device has a disadvantage that it takes much time to measure an inside temperature or a real temperature of a substance to be measured having a difference in temperature between the inside thereof and the surface thereof when such a temperature measuring is effected at a surface of the substance. The substance as mentioned above includes a body of a human being and a body of an animal etc. Stated illustratively, a human being or an animal keeps his body temperature or body heat at a certain degree by radiating outside of his body the heat generated therewithin and the body temperature is always cooled by the air at the body surface. Accordingly, the temperature of the body surface is lower than the real temperature or the inside temperature of the body. Thus, for measuring a body temperature, no matter how closely the arm may be contacted with the body, it takes considerable time to elevate the surface temperature to the real temperature or the inside temperature of the body. On the other hand, since a heat sensitive element such as a thermistor is ordinarily encased in a stick-like case to facilitate a temperature measuring, it takes time to heat it to the real temperature of the body, too. Thus, with the conventional measuring device, it is impossible to shorten substantially the time required for measurement of a real temperature or an inside temperature of a body.

The present invention was made to overcome the above-mentioned disadvantage and, therefore, it is an object of the present invention to provide a method and a device for measuring an inside temperature or a real temperature of a substance which has a difference in temperature between the inside thereof and the surface thereof, by preheating a heat sensitive element to a temperature near said real temperature of the substance to be measured thereby to much shorten the time required for measuring the temperature.

It is another object of the present invention to provide a method and a device for measuring an inside temperature or a real temperature of a substance which has a difference in temperature between the inside thereof and the surface thereof by applying, to a surface of the substance, heat substantially equal, in amount, to heat which is given from the inside of said substance to draw the temperature of the surface near the inside temperature or the real temperature of the substance, thus curtailing the time required for response to the temperature to be measured and, accordingly, the time required for the temperature measuring.

Essentially according to the present invention, there is provided a method for measuring an inside temperature or a real temperature of a substance having a difference in temperature between the inside thereof and the surface thereof, which comprises preheating a heat sensitive element to a temperature near the inside or the real temperature of said substance thereby to enable the time required for the measuring of the inside temperature or the real temperature of the substance to be shortened and a device for measuring an inside temperature or a real temperature of a substance having a difference in temperature between the inside thereof and the surface thereof, which comprises a heat sensitive element for detecting a temperature of said substance; a heating circuit for preheating said heat sensitive element to a temperature near the inside or the real temperature of said substance; and a measuring circuit for measuring a resistance variation of said heat sensitive element depending upon a temperature variation thereof.

These and other objects and features of this invention will be better understood upon consideration of the following detailed description and the accompanying drawings in which.

Figure 1:
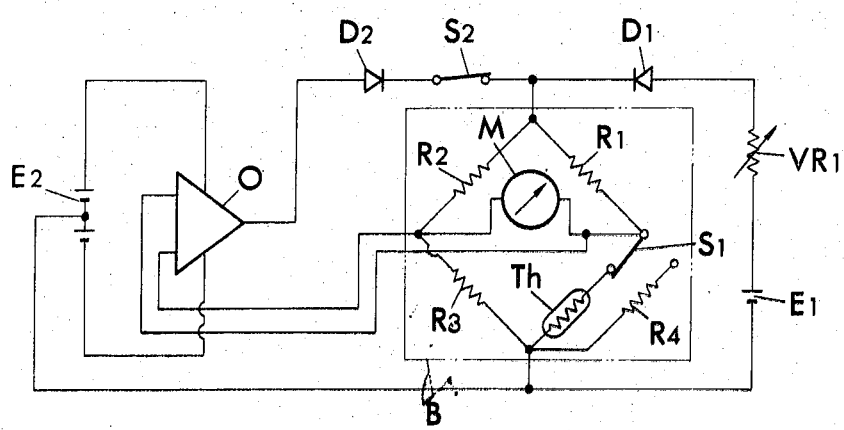
FIG. 1 is a circuit diagram of a measuring device embodying the present invention.

With reference now to drawings and more particularly to FIG. 1 thereof, there is illustrated a circuit of a temperature measuring device embodying the present invention. Numeral B designates a bridge circuit composed of resistors $R_1$, $R_2$ and $R_3$, a thermistor $Th$, a resistor $R_4$ connected in parallel with said thermistor Th and a switch $S_1$ for selecting said thermistor $Th$ or said resistor $R_4$. In the present embodiment, a thermistor is employed as a heat senser but, of course, other various heat sensitive elements, such as a varistor, whose resistances are variable proportionally to the temperature may be employable. A power source $E_1$ is adapted to supply a current to said bridge circuit B through a variable resistor $VR_1$ and a diode $D_1$. Numeral 0 designates an operational amplifier whose input terminal is connected with an output terminal of the bridge circuit B. An output terminal of said operational amplifier 0 is connected to the power source of the bridge circuit B through a $D_2$ and a switch $S_2$. Numeral $E_2$ represents a power source of the operational amplifier 0. Numeral M designates a meter connected to an output terminal of the bridge circuit B.

In operation:

A circuit composed of the power source $E_1$, the bridge circuit B, the diode $D_1$ and the variable resistor $VR_1$ is a temperature measuring circuit for measuring a temperature of a substance to be measured, for example, a body temperature. Whereas, a circuit composed of the power source $E_2$, the operational amplifier 0, the diode $D_2$ and the switch $S_2$ is a heating circuit for preheating the thermistor Th of the bridge circuit B up to the possible lowest temperature of the substance to be measured. The values of the resistors $R_1$, $R_2$ and $R_3$ of the bridge circuit B are determined to balance at a temperature near said possible lowest temperature of the substance to be measured (for example, 35°C. in case of measuring a human body temperature).

Thus, it will be seen that when the thermistor Th is at a room temperature, the balance is not kept in the bridge circuit B and an output current flows between output terminals of said bridge circuit B to apply an input to said operational amplifier 0. Then, said operational amplifier 0 produces a positive output voltage. Thus, the amplifier 0 is kept to apply a positive output voltage to the power source terminal of the bridge circuit B through the diode $D_2$ and the switch $S_2$ until the temperature of the thermistor T$h$ is raised up to the possible lowest temperature of the substance to be measured. Since the output voltage to be applied is higher than that of the power source $E_1$, a voltage to be applied to the thermistor Th gets higher. When a high voltage is applied to the thermistor Th, said thermistor Th begins to be self-heated. The temperature of the thermistor T$h$, accordingly, rises up to substantially the possible lowest temperature of the object to be measured, at which said bridge circuit B is balanced. Then, the voltage at the output terminal of the bridge circuit B becomes zero and the output voltage of the operational amplifier 0 also becomes zero. Therefore, only the voltage of the power supply $E_1$ is applied to the thermistor Th. The self-heating of the thermistor Th is reduced to stop the rising in a temperature of the thermistor Th. Thus, the thermistor Th is preheated to a temperature near the possible lowest one of the substance to be measured (35°C. in case of measuring a human body temperature).

In measuring a temperature, when the thermistor Th, due to the heat of the substance to be measured, rises above the temperature where the bridge circuit B is balanced, the balance of said bridge circuit B is broken and a voltage is applied across the output terminals thereof. However, a polarity of the voltage is opposite to that of the voltage as specified before and the output of the operational amplifier becomes negative. This negative output is blocked by the diode $D_2$ against the power source terminal of the bridge circuit B. Only a voltage of the power source $E_1$ is applied to the bridge circuit B. Stated illustratively, at a temperature above the temperature where the bridge circuit B is balanced, said bridge circuit B acts as a temperature measuring circuit. The temperature of the thermistor T$h$ rises by using the power source $E_1$ as a power supply to deflect a needle pointer of the meter M. Accordingly, the temperature of the object to be measured can be quickly read from the meter M.

Figure 2:
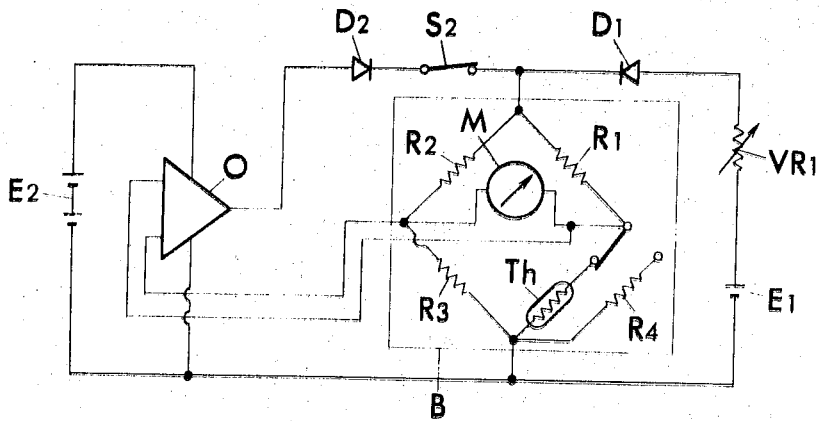
FIG. 2 is a modified circuit of the measuring device shown in FIG. 1.

In FIG. 2, there is illustrated a modification of the temperature measuring device as shown in FIG. 1. In the modified temperature measuring device of FIG. 2, all of the voltage of the power source $E_2$ is applied to the operational amplifier 0, while, in the temperature measuring device of FIG. 1, half of the voltage of said power source $E_2$ is applied thereto. The diode $D_1$ is connected for the purpose of preventing the output voltage of the preheating circuit from being applied to the power source $E_1$, thereby to keep increasing in the terminal voltage of the bridge circuit B. The switches $S_1$ and $S_2$ and the variable resistor $VR_1$ are used for a full-scale regulation of the meter M. For the purpose, the switch $S_1$ is switched to the resistor $R_4$ from the thermistor Th, and the switch $S_2$ is opened. Then, the variable resistor $VR_1$ is regulated to render the meter M to be in full-scale. In this connection, the resistance of said resistor $R_4$ is determined to correspond to a possible highest temperature of the substance to be measured.

As mentioned above, according to the present invention, the temperature of the heat sensitive element such as a thermistor is raised to a temperature near the possible lowest temperature of the substance to be measured by self-heating the thermistor owing to the output voltage of the operational amplifier when the temperature of the thermistor is lower than the possible lowest temperature of the object to be measured, thereby to much curtail the time required for heating the heat sensitive element to the real temperature of said substance and, accordingly, the time required for the temperature measuring, as compared with a conventional temperature measuring device.

Figure 3:
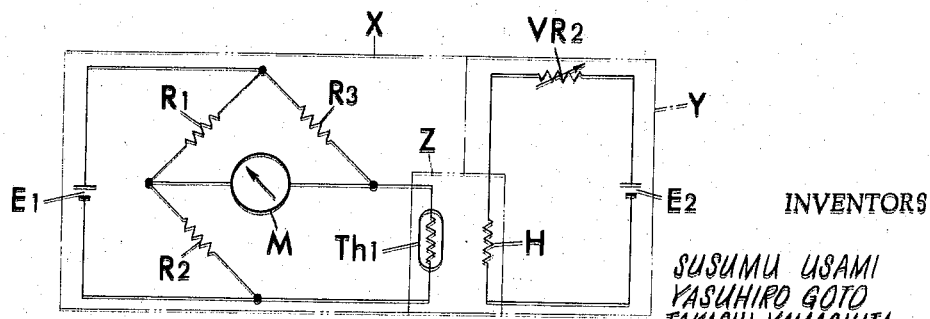
FIG. 3 is a circuit diagram of another form of temperature measuring device embodying the present invention.

Referring now to FIG. 3, there is illustrated a circuit for another form of a temperature measuring device having a circuit for applying heat to the surface of the substance and a heat sensitive probe. A temperature detecting circuit X is of the conventional bridge type which comprises a bridge circuit consisting of resistors $R_1$, $R_2$ and $R_3$ and thermistor T$h_1$, a meter M indicating the temperature by way of said thermistor T$h_1$ and a potential source $E_1$. A heating circuit Y comprises a heater H, a variable resistor $VR_2$ for regulating the temperature and a potential source $E_2$ for the heater. Said thermistor T$h_1$ of the temperature detecting circuit X and said heater of the heating circuit Y are encased in one section which may be denoted a thermostatic section.

In order to measure an inner temperature of the substance, the temperature of said thermostatic section is maintained over the ordinary inner temperature by regulating the variable resistor $VR_2$ according to the indication of the meter M in which a needle is adapted to move in proportion to the resistor value of said thermistor T$h_1$. Then, a measurement is effected by applying said thermostatic section Z to the surface of the substance to be measured and pushing outward the thermistor T$h_1$ from the thermostatic section to bring it into contact with the surface of the substance.

In the above explained circuit illustrated in FIG. 3, the temperature is regulated manually. However, in view of difficulty in handling the above embodiment, another circuit permitting automatic temperature regulation is illustrated referring to FIG. 4.

Character X designates a temperature measuring circuit line FIG. 3. In a heating circuit Y', an anode of a heating potential source $E_2$ is connected to a thermistor T$h_2$, a variable resistor $VR_2$ and then to a cathode of said potential source $E_2$. A transistor $TR_1$ is connected at the base thereof to a junction of said thermistor T$h_2$ and variable resistor $VR_2$. A collector of said transistor $TR_1$ is connected to the anode of the potential source $E_2$ through a resistor $R_5$ and to a base of a transistor $TR_2$ through a resistor $R_6$. Emitters of the transistors $TR_1$ and $TR_2$ are connected to the cathode of the potential source $E_2$ through a resistor $R_7$. The base of said transistor $TR_2$ is also connected to the cathode of the potential source $E_2$ through a resistor $R_8$. A thermostatic section Z' is composed of the thermistors T$h_1$ and T$h_2$, and heater H.

In operation:

Since the heating circuit Y' is of Schmidt (trigger) circuit type including the thermistor T$h_2$, when the temperature of the thermostatic section is low, resistance of the thermistor $Th_2$ is great and bias voltage of the transistor $TR_1$ becomes low to turn it off, while the other transistor $TR_2$ becomes conductive to supply current to the heater H thereby to elevate the temperature in the thermostatic section Z'.

When the temperature of the thermostatic section Z' becomes too high, resistance of the thermistor $Th_2$ becomes small and bias voltage of the transistor $TR_1$ becomes high to turn on the transistor $TR_1$, while the transistor $TR_2$ is cut off thereby to stop heating the thermostatic section Z' by the heater H. The temperature in the thermostatic section Z' is automatically kept at a fixed degree to put the thermistor $Th_1$ in condition that it can be applied to the surface of the substance for measuring the temperature inside the same.

Figure 5:
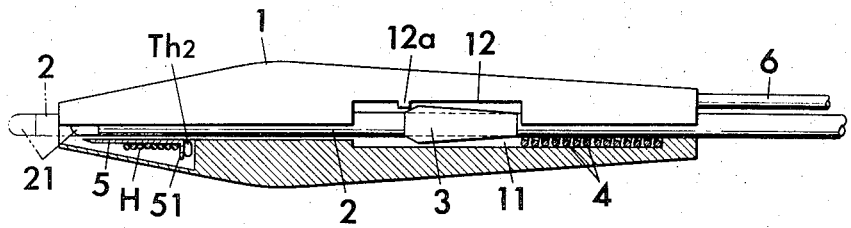
FIG. 5 is a longitudinal cross sectional view of the temperature measuring device shown in FIG. 3.

Referring to FIG. 5, there is illustrated a structure of the thermostatic section Z'. Numeral 1 designates a rocket type case made of thermally non-conductive material and defined in a size and shape insertible under one's arm. An axially extending bore 11 is formed in the center of the case and a longitudinal hole 12 communicating with said axial bore 11 is formed in a peripheral wall of said axial bore 11. On a wall of said longitudinal hole 12, a lock projection 12a is projectingly formed. A cord 2 is inserted through the axial bore 11 of the case 1 and can move slidably in the bore longitudinally. To one end of said cord is connected to the thermistor $Th_1$ of said heating circuit and a thermally conductive cap 21 is fitted over said thermistor $Th_1$. The other end of the cord 2 is introduced outward from the case 1.

Numeral 3 designates a button encased in said longitudinal hole 12 and fixed at the bottom thereof to said cord 2. A spring 4 is provided between said button 3 and the backward end of case 1 to push the button 3 forward. Usually the button 3 is checked its forward movement by the lock projection 12a in the hole 12, however, when forcibly pushed by a measurer, the button 3 is disengaged from the lock projection 12a and allowed to move forward. With said forward movement of the button 3, the cord 2 slidingly moves enabling the cap 21 to appear from the top of the case 1 and is sustained in the same position by the spring 4. A thermally conductive pipe 5 is provided in the top portion of the case 1 in which the cap 21 is usually encased. A heater H is provided winding around said pipe 5. To a flange portion 51 of said pipe 5 is fixedly attached the thermistor $Th_2$ of the heating circuit Y'. The cap 21 and pipe 5 are so constructed as to slidably contact with each other so that a heat of the pipe 5 can be effectively transmitted to the cap 21 when the cap 21 is encased in the case 1. Numeral 6 is a cord for the heater H and thermistor $Th_2$.

Figure 4:
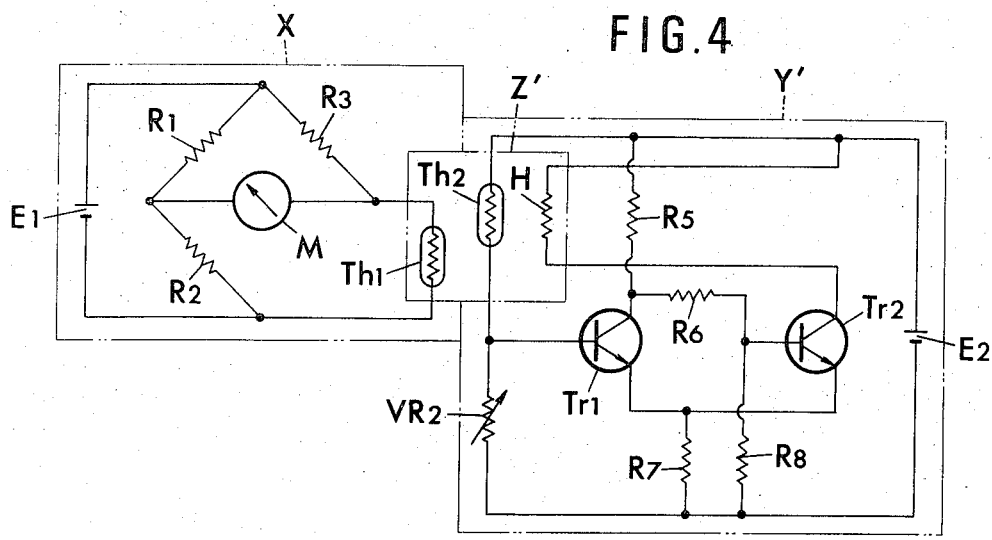
FIG. 4 is a modified circuit diagram of the temperature measuring device shown in FIG. 3.

The method of measuring a temperature of a substance, for example, a body temperature of an animal is explained as follows;

When the cord 6 is connected to the heating circuit Y' shown in FIG. 4, the pipe 5 in the case 1 is heated by the heater H and accordingly the cap 21 is also heated. The temperature of the cap 21 is kept at a fixed degree around the temperature to be measured, preferably above that temperature by way of the thermistor $Th_2$ and transistor circuit. In order to make measurement, the cap 21 is introduced outward by pushing forcibly the button 3 forward and brought into contact with a skin of the animal. Since the cap 21 is preheated above the body temperature, the temperature of the skin to be measured is instantly elevated up to the real body temperature and, at the same time, the temperature of the cap 21 falls as low as the real body temperature. In this instance, the case, being made of non-conductive material, does not transmit a heat to the skin, and therefore, the measurement can be effected in a short period.

Figure 6:
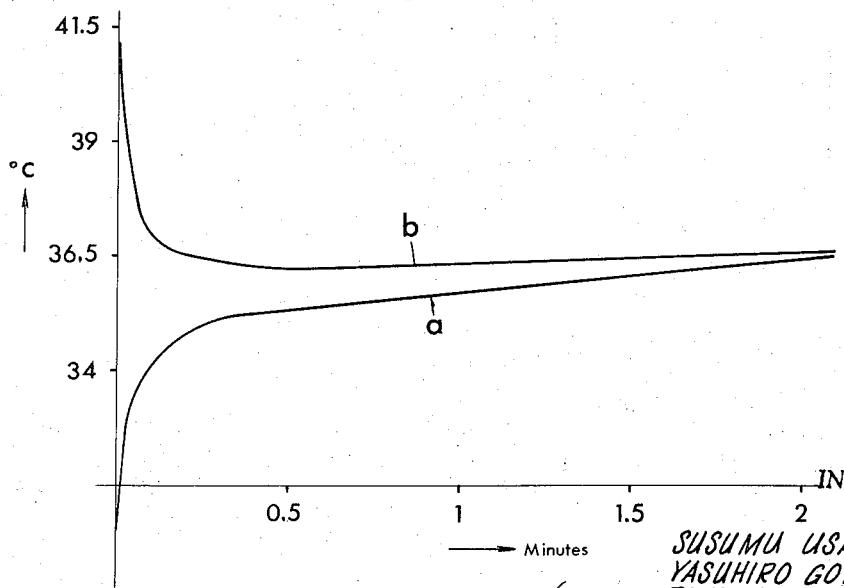
FIG. 6 is a diagram showing response characteristics of the present and a conventional temperature measuring device to a temperature to be measured.

A comparison between a conventional thermistor-type thermometer and the present temperature measuring device in respect of transition of respective temperatures is shown in a diagram of FIG. 6. In the conventional thermometer, the temperature is still on the rise as shown by a line $a$ even after 2 minutes since it's contact to the skin, whereas line $b$ of the present device shows a stable indication after only 15 seconds.

As described, in the present invention, the cap incorporating the thermistor therein is usually heated in the thermostatic section to be around, preferably above the real temperature of the substance to be measured and then pushed outward from the thermostatic section thereby to apply heat to the surface of the substance which has always been cooled by the open air. Thus the present device can rapidly elevate the temperature of the body surface up to the real temperature of its own thereby abbreviating the period for measuring the temperature extremely.

The temperature measuring device of the present invention as mentioned above may also be applicable for measuring a body temperature of a human being.

What is claimed is:

1. An electric temperature measuring device, comprising:
    a bridge circuit having a heat sensitive electrical element in one of its sides, said bridge circuit having a power supply terminal;
    a power source connected for supplying voltage to said bridge circuit;
    a first diode connected in series between said power source and said power supply terminal;
    an operational amplifier connected to the bridge circuit for amplifying an unbalanced voltage of said bridge circuit, said amplifier having an output terminal coupled to said power supply terminal for supplying the output voltage of said amplifier to said power supply terminal;
    a second diode connected in series between said output terminal of said amplifier and said power supply terminal;
    whereby an unbalanced voltage in said bridge circuit, amplified by said amplifier, effects self-preheating of said heat sensitive electrical element and thereafter said power source supplies voltage for temperature measurement.

2. An electrical temperature measuring device according to claim 1, including a resistance connected in parallel with said heat sensitive electrical element, a first switch connected for alternatively connecting either said resistance or said heat sensitive electrical element in one of the sides of said bridge circuit, and a second switch connected in series in the circuit between said output terminal of said amplifier and said power supply terminal.

3. A method for measuring the internal temperature of an animal or human body having a difference in temperature between the interior thereof and an external surface thereof having a known temperature relationship with said internal temperature, which comprises preheating a heat-sensitive probe to a temperature elevated above said internal temperature prior to the measuring, applying said preheated, heat-sensitive probe while substantially at said elevated temperature to said external surface of the body at the measuring area thereof to rapidly heat the external surface at said measuring area, and then measuring said external temperature as a measure of said internal temperature by means of said heat sensitive probe.

4. An electric temperature measuring device, comprising:
   a bridge circuit having a heat sensitive electrical element in one of its sides and a temperature responsive output;
   a power source connected for supplying voltage to said bridge circuit;
   electrical heating means separate from said heat sensitive electrical element but positioned in close proximity thereto for preheating said heat sensitive electrical element;
   a second power source for supplying voltage to said heating means;
   and means for regulating the voltage supplied to said heating means independently of said bridge output in order to control the temperature to which the heat sensitive electrical element is preheated, said regulating means comprising a second heat sensitive elecrical element separate from but positioned in close proximity to said heat sensitive electrical element in said bridge circuit and said heating means so as to be heated by said heating means to substantially the same extent as said heat sensitive electrical element in said bridge circuit;
   control means connected in circuit with said heating means and said second power source for controlling the supply of voltage to said heating means, said second heat sensitive electrical element being connected to said control means for operating same in response to the temperature of said second heat sensitive electrical element.

5. An electric temperature measuring device, comprising:
   a bridge circuit having a heat sensitive electrical element in one of its sides and a temperature responsive output;
   a power source connected for supplying voltage to said bridge circuit;
   electrical heating means separate from said heat sensitive electrical element but positioned in close proximity thereto for preheating said heat sensitive electrical element;
   a second power source for supplying voltage to said heating means;
   and means for regulating the voltage supplied to said heating means independently of said bridge output in order to control the temperature to which the heat sensitive electrical element is preheated;
   a nonheat conductive casing, a probe having a cap made of thermally conductive material with said heat sensitive electrical element of the bridge circuit being disposed inside said cap, means supporting said probe in said casing for movement between a first position in which said cap is disposed within said casing and a second position in which said cap projects from said casing, said heating means being fixedly disposed within said casing, said heating means being in close heat transmitting sliding contact with said cap to heat same when said probe is in said first position, said cap being spaced out of contact with said heating means in said projecting second position thereof.

* * * * *